Figure 1:
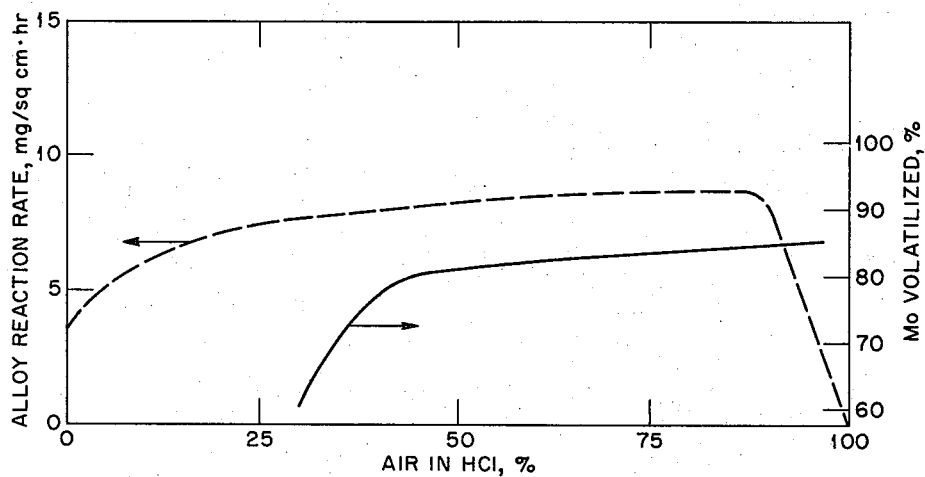

Sept. 15, 1964  T. A. GENS  3,148,941
DISSOLUTION OF URANIUM-MOLYBDENUM REACTOR FUEL ELEMENTS
Filed March 30, 1961  2 Sheets-Sheet 1

INVENTOR.
Theodore A. Gens
BY

ATTORNEY

Sept. 15, 1964      T. A. GENS      3,148,941
DISSOLUTION OF URANIUM-MOLYBDENUM REACTOR FUEL ELEMENTS
Filed March 30, 1961      2 Sheets-Sheet 2

INVENTOR.
Theodore A. Gens
BY
ATTORNEY

United States Patent Office 3,148,941
Patented Sept. 15, 1964

3,148,941
DISSOLUTION OF URANIUM-MOLYBDENUM
REACTOR FUEL ELEMENTS
Theodore A. Gens, Oak Ridge, Tenn., assignor to the
United States of America as represented by the United
States Atomic Energy Commission
Filed Mar. 30, 1961, Ser. No. 99,648
8 Claims. (Cl. 23—14.5)

The present invention relates to a method of reprocessing uranium-molybdenum reactor fuel compositions. More particularly, it relates to a dissolution process whereby uranium-molybdenum reactor fuel compositions are dissolved to form an aqueous solvent extraction feed solution from which uranium and other fissionable and/or fertile values may be selectively extracted into an aqueous immiscible organic liquid.

During the operation of a going nuclear reactor containing solid metallic fuel elments, fission products accumulate inside the fuel elements, and if this accumulation is allowed to continue, the reactor eventually becomes poisoned and must shut down. In many cases, even before poisoning occurs, deleterious physical changes take place in the fuel elements to necessitate their removal from the core. These physical changes include warping, elongation or shrinkage in one or more directions, bending, and the forming of surface protrusions. Also in some cases, the cladding material may rupture, causing long-lived radioactive fission products to diffuse into the reactor coolant, again necessitating the removal of fuel elements from the core. Although fuel elements may be removed from the reactor core for any of these reasons, structural and nuclear considerations usually limit the "burnup" or useful life of the reactor fuel element in the reactor core.

At the time of discharge, the irradiated fuel element may contain up to 99% of its original charge of fissionable material. This material represents too high a capital investment to discard, and so it must be separated from the fission products and refabricated into a fresh element for reuse in the reactor. A major method of processing of spent fuel elements to recover fissionable and fertile elements and valuable fission products is by the use of liquid-liquid solvent extraction techniques.

It has been found that the addition of a few percent molybdenum to the uranium markedly improves the corrosion resistance and dimensional stability under thermocycling and radiation as compared to unalloyed uranium. For example, a binary uranium–10% molybdenum alloy can be operated up to 600° C. with essentially no adverse distortional effects. The addition of about 10% or more molybdenum produces a binary alloy in which the metallic structure of gamma uranium is readily retained even at room temperature. As a result, uranium-molybdenum alloys have been proposed for use as the active core of a solid reactor fuel element. A fuel element of such an alloy may be clad with aluminum, zirconium, stainless steel or some other normally refractory non-reactive material.

It is a general object of this invention to separate uranium and other fissionable and fertile values from a uranium-molybdenum reactor fuel. A specific object of this invention is to effect separation of uranium and/or plutonium from uranium-molybdenum compositions by liquid-liquid solvent extraction. An essential prerequisite to attain this object is the formation of a stable solution, by which is meant a solution in which all of its solute ingredients are soluble in a homogeneous liquid phase over a relatively wide range of concentration and temperature. A stable feed solution is necessary for efficient liquid-liquid extraction. If any material tends to precipitate, it will usually result in coprecipitation of uranium and other valuable fissionable and fertile values. A stable solution is also necessary to avoid or at least reduce the possibility of forming a critical mass. In a solvent extraction process in which very large quantities of fissionable material are handled and in which a large holdup inventory can accumulate in the solvent extraction system, there is danger of the formation of an accidental or unscheduled nuclear chain reaction. The probability of such an incident occurring can be reduced to a minimum if the fissionable materials can be handled in one physical state, such as in solution rather than in two or more states where the uranium exists both in solution or as a colloid or slurry or precipitate. Further, it is important that the volume of the aqueous extraction feed solution be minimal while at the same time contain a maximum quantity of dissolved uranium. Large volumes of uranium-bearing solvent extraction feed solutions result in large volumes of radioactive waste solutions. A solution is formed by dissolving the solid uranium-bearing fuel element. In this connection it is desirable that the process be characterized by a high, but controllable, dissolution rate, and should be adaptable to forming a solution up to 1 M or more in uranium without any metallic precipitation. Finally, the overall dissolution process should be characterized by the use of a minimal number of chemical reagents and process operations to produce the desired stable solution.

While the use of uranium-molybdenum alloys and compositions as reactor fuels involves a number of advantages previously referred to, a serious disadvantage is encountered during fuel dissolution. Uranium readily dissolves in nitric acid solutions, but molybdenum under the same conditions is oxidized to a finely divided insoluble molybdic acid precipitate. This, in turn, results in the coprecipitation of valuable fissionable material and useful fission products. While the precipitate can be separated from solution by well-known techniques such as centrifugation, filtration, and even decantation, these additional process operations are difficult and expensive when handling highly radioactive solutions. Moreover, while this uranium may be subsequently leached out of the resultant precipitate, the additional expense of recovery and the additional volume of radioactive waste dissolution resulting therefrom makes it an unsatisfactory procedure.

In an attempt to form a stable uranyl nitrate solution from uranium-molybdenum elements, some workers have suggested the use of an iron-complexing agent to form a soluble iron-molybdenum complex. This suggested remedy is satisfactory in some respects, but it has the drawback of adding an extraneous metallic impurity to increase the volume of radioactive liquid, and in addition, it reduces the solubility of uranium in solution.

With this background of the problem in mind, it is obvious that a need exists for and it is therefore a principal object of this invention to provide a stable uranium solution from a uranium-molybdenum composition. Another object of this invention is to provide a process for forming a stable solution of uranium from a neutron-irradiated uranium-molybdenum alloy. A further object of this invention to provide a method for the separtion and recovery of uranium and/or plutonium from molybdenum-containing alloys and other mixtures of molybdenum with uranium. Other objects and advantages accruing from the present invention will become apparent as the description proceeds.

Figure 2:
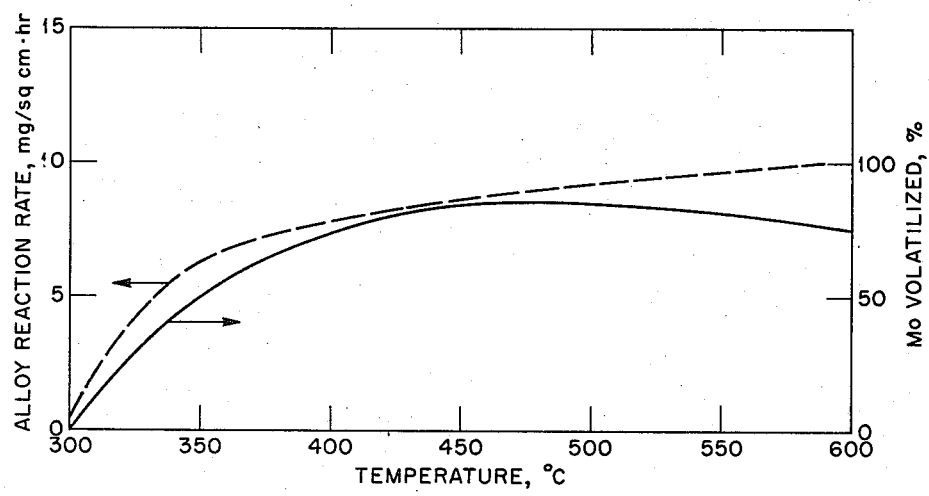

I have found that molybdenum may be effectively separated from uranium by a volatilization process, the essential steps of which comprise reacting a uranium-molybdenum mixture with a gaseous mixture of hydrogen chloride and air at a temperature in the approximate range 375 to 600° C. to thereby form a volatile molybdenum-oxychloride product, and a non-volatile oxidized uranium product. This reaction is unusual in that an acceptably high and uniform reaction rate can be achieved. Moreover, the reaction rate is uniformly high over a relatively wide range of temperatures. The described characteristics of this reaction can be traced more accurately by reference to FIGS. 1 and 2. FIG. 1 is a graph showing the reaction rates of a U–10% molybdenum alloy and the amount of molybdenum volatilized therefrom as a function of the composition of the oxyhydrochlorination reagent, and FIG. 2 is a graph showing the effect of the reaction rate of the alloy and the amount of molybdenum volatilized therefrom as a function of the temperature of oxyhydrochlorination. From a consideration of these two graphs it will be seen that an optimum combination of uniform rate of alloy dissolution and maximum volatilization of molybdenum is achieved with HCl-air mixtures containing approximately 10–60% hydrogen chloride by volume at a temperature in the range 400–600° C. In fact, as seen from FIGS. 1 and 2, no substantial advantage is gained in using a mixture containing more than about 15% HCl or a temperature much above 450° C. A 15%–HCl-air mixture is optimum from the point of view of nearly constant and high reaction rate, separation of molybdenum and chloride, minimum reagent cost, and minimum corrosion. Under these conditions about 85% of the molybdenum is volatilized while substantially no uranium is converted to a volatile product, but is rather oxidized to a uranium oxide product consisting principally of $U_3O_8$, with a small amount of residual chloride. The unusual characteristics of this reaction may be contrasted by comparison with results achieved with similar chlorinating agents such as $Cl_2$ and phosgene. The reaction of chlorine with uranium-molybdenum mixtures has been found to be exceedingly exothermic and, while effective in volatilizing the molybdenum, the exothermicity of the reaction leads to concurrent volatilization of the uranium, as uranium chlorides. Attempts to use mixtures of $Cl_2$ and air were equally unsuccessful. In that case a protective coat of a yellow material, possibly uranyl chloride, inhibited reaction to an impractically low reaction rate, 0.27 mg./cm.$^2$-min. Phosgene was also found to react with uranium-molybdenum alloys at an impractically low rate. Mixtures of phosgene and air react with uranium-molybdenum at a temperature of about 400° C. at a practically high rate, but have been found to volatilize only about 60% of the molybdenum while leaving nearly half of the total chloride used in the oxyhydrochlorination product.

The oxyhydrochlorination product consists of a mixture of uranium oxide with as much as 15% of the molybdenum originally present, as a non-volatile molybdenum oxide. Essentially all of the remaining molybdenum in the oxyhydrochlorination mixture can be volatilized readily as the oxychloride by contacting it with gaseous hydrogen chloride at a temperature of about 400° C. The solid residue will now consist principally of uranium oxides and some chloride contamination. This uranium-containing residue will readily dissolve in nitric acid and the resulting solution can be used, after suitable additions of salting agents, as a solvent extraction feed solution.

Unfortunately, a nitrate solution containing chloride in amounts appreciably greater than about 200 parts per million is excessively corrosive to most materials of construction, particularly stainless steel. Since much of the solvent extraction apparatus currently being used is susceptible to corrosion by such media, steps must be taken to reduce the chloride content to a non-corrosive level.

In accordance with an important aspect of my invention, I prevent the formation of a corrosive nitric acid-hydrochloric acid solution by removing a substantial portion of the chloride content of the oxyhydrochlorination mixture by treatment of said mixture with air, which contains about 3%, by volume, water at a temperature in the range 300–500° C. in order to volatilize the chloride values to a non-corrosive level. In addition to chloride removal, air treatment serves to remove some of the residual molybdenum values from the uranium-containing oxyhydrochlorination product. While air containing more than 3% water can be used to effect efficient chloride removal, any residual molybdenum is likely to form a non-volatile oxide. By these means, a uranyl nitrate solution containing less than about 200 parts per million of chloride is obtained. At a chloride concentration of 200 p.p.m. or less, the nitric acid solution, while still corrosive, can be tolerated in most metal-container systems.

Figure 3:
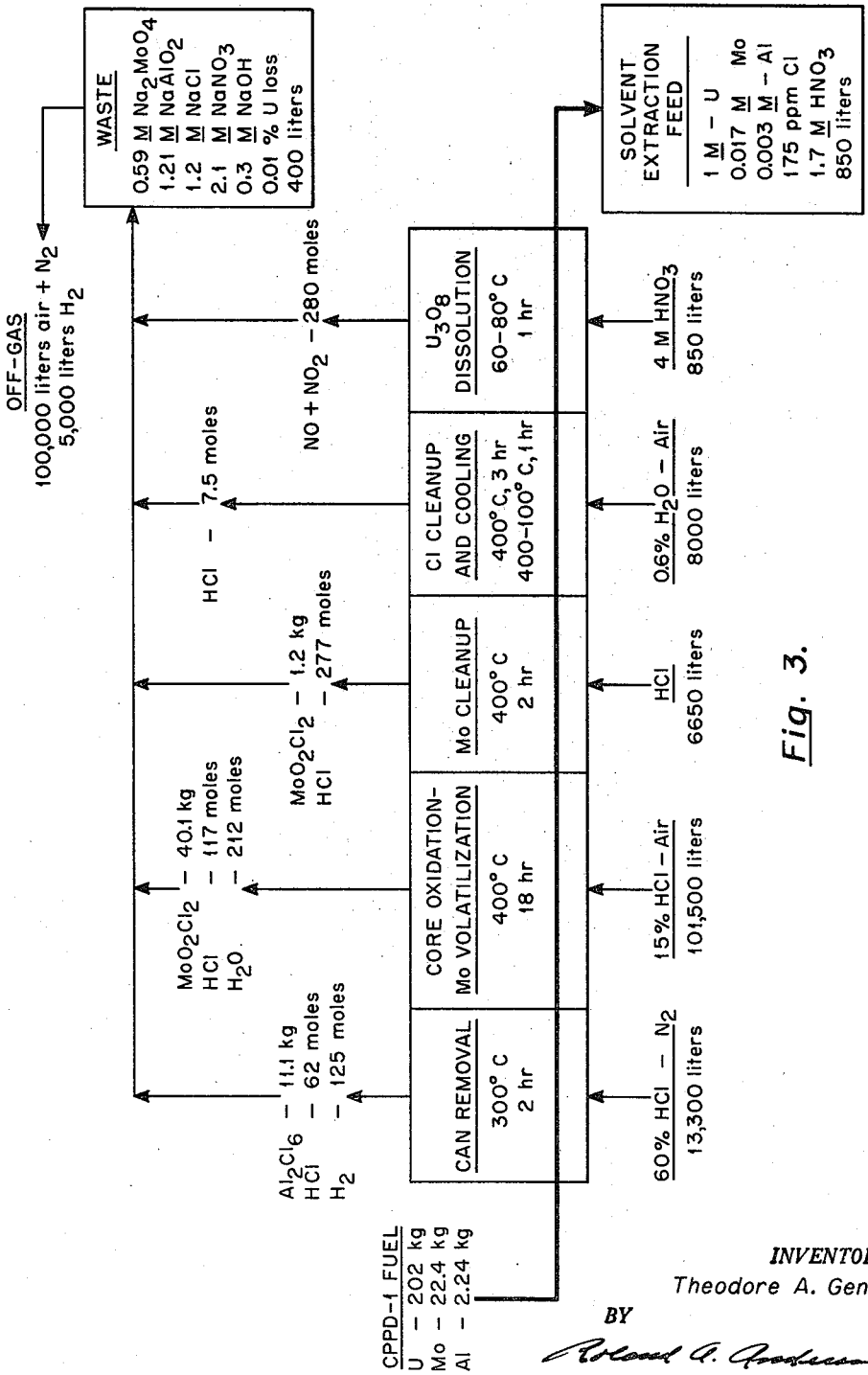

FIG. 3 is a diagrammatic flow sheet which illustrates a typical sequence of operations involved in preparing a stable solvent extraction feed solution in accordance with the present invention from a nuclear fuel charge containing an assembly of fuel elements consisting of a meat of a uranium alloy containing about 10% molybdenum, by weight, canned in aluminum. This fuel can be used in a reactor of the kind described in "Power Reactors," an AEC Technical Information Service publication, pages 57–64, and in Nucleonics, vol. 18, No. 6, p. 94, 1960. As shown, the aluminum can of the reactor fuel charge is removed by reaction with a gaseous mixture containing about 60% hydrogen chloride or chlorine in an inert gas carrier such as nitrogen at a temperature of about 300° C. to thereby volatilize the aluminum as aluminum chloride.

I have found that the reaction between aluminum and HCl is characterized by a relatively long initiation period, which is probably due to a passivating aluminum oxide surface layer. This initiation period can be considerably reduced by adding a small amount of dry ammonium chloride. In all cases studied, where some ammonium chloride was added as initiator with the reagent gas diluted up to 50% with nitrogen, reaction proceeded at a practically high rate in less than 10 minutes at 300° C., whereas in the absence of initiator, passivation periods in excess of one hour were noted.

With the aluminum can removed, the fuel core is then exposed and is ready for reaction with a 15% HCl–85% air mixture at a temperature of at least 375° C. to thereby volatilize up to 90% of the molybdenum as molybdenum oxychloride. As shown, after treatment for 18 hours, 40 kilograms of molybdenum oxychloride will be produced, which represents 86% of the total molybdenum in the original fuel element. The oxyhydrochlorination product consists of uranium oxides, principally $U_3O_8$, and the remainder of the molybdenum as non-volatile molybdenum oxides. The remaining molybdenum may now be removed by treatment with pure hydrogen chloride to form the volatile molybdenum oxychloride. The total result after oxyhydrochlorination and hydrochlorination is the removal of substantially all of the molybdenum, leaving a uranium oxide product containing excessive amounts of chloride. The chloride content of the uranium oxide mixture must now be reduced to a level which will form a relatively non-corrosive nitric acid solution. This is accomplished by contacting the uranium oxide product with air containing up to 3% water at a temperature of about 400° C. for a period ranging from 1 to 4 hours, the time of contact and temperature being a function of the extent of desired chloride removal. As seen in the treatment of the particular fuel charge illustrated in FIG. 3, chloride removal involving treatment with hot air containing 0.6% water at a temperature of 400° C. for three hours and then at a temperature in the range 100–400° C. for a period of one hour results in a uranium oxide product which is readily dissolved in 4 M $HNO_3$ to yield a stable solution of 1 M uranium, 0.017 M molybdenum, 0.003 M Al, 175 p.p.m. Cl, and 3 M $HNO_3$.

In the process, as shown in FIG. 3, volatilization of aluminum, molybdenum and chloride removal should preferably take place in one container made of a suitably corrosion-resistant material such as Haynes 25, an alloy obtained from the Union Carbide Corporation containing cobalt, nickel, chromium, tungsten and molybdenum as the principal alloy ingredients. The amount of reagents used and products produced are representative of what can be achieved in processing uranium-molybdenum alloys containing up to about 50% molybdenum to form a stable solvent extraction feed solution from which uranium and other valuable fissionable products may be extracted by well-known liquid-liquid solvent extraction techniques which are amenable for the reprocessing of nuclear fuel solutions produced by the present invention are described in TID-7534, an AEC Technical Information Service publication.

While the invention has been described and exemplified in connection with processing aluminum clad elements, it is also useful in treating uranium-molybdenum cores which are clad in stainless steel or zirconium. A zirconium cladding will react with gaseous hydrogen chloride at a temperature in the range 350-800° C. to form the volatile and easily separable zirconium tetrachloride. Stainless steel will react completely with $Cl_2$ gas at a temperature of 600° C. or above. The principal alloy constituent, iron, will be volatilized as ferric chloride. In either case, the resultant exposed uranium-molybdenum core can then be treated in accordance with procedure hereinbefore described to form a stable solvent extraction uranyl nitrate feed solution.

Also, while the flow sheet of FIG. 3 refers to the treatment of a composition containing 10% molybdenum and describes a molybdenum cleanup operation using gaseous hydrogen chloride to effect volatilization of residual molybdenum values, this operation may be dispensed with and still obtain a stable uranyl nitrate solution, when the original fuel mixture to be treated contains lesser amounts of molybdenum. It should also be understood that this invention is also applicable to the separation of plutonium from reactor fuel compositions containing molybdenum to form a stable plutonyl nitrate solvent extraction feed solution in a manner similar to the procedure described for separating uranium from such compositions to form a stable uranyl nitrate solution. In molybdenum fuel compositions containing uranium as well as plutonium, stable uranyl and plutonyl nitrate solution will be formed in accordance with the process hereinbefore described. Other variations within the scope of this invention will readily occur to those skilled in the art.

Having thus described my invention, I claim:

1. A process for separating uranium from a uranium-molybdenum composition which comprises contacting said composition with a gaseous oxyhydrochlorination mixture comprising air and from about 10-60%, by volume, of hydrogen chloride at a temperature in the range 400° C. to 600° C. to selectively volatilize at least a major portion of the molybdenum and then dissolving the resultant uranium-containing oxyhydrochlorination product in an aqueous solution of nitric acid to form a stable uranyl nitrate solution.

2. The process of claim 1, wherein the oxyhydrochlorination mixture contains from approximately 15%, by volume, of hydrogen chloride and wherein selective volatilization of molybdenum values is conducted at a reaction temperature in the range 400-450° C.

3. A process for separating uranium from a neutron-irradiated uranium-molybdenum composition which comprises contacting said composition with a gaseous mixture of air and hydrogen chloride containing about 10-60%, by volume, hydrogen chloride at a temperature in the range 400-450° C. to selectively volatilize at least a major portion of said molybdenum, contacting the resultant uranium oxyhydrochlorination residue with gaseous hydrogen chloride at a temperature of at least about 400° C. to selectively volatilize residual molybdenum and thereafter dissolving the resultant product in an aqueous solution of nitric acid to form a stable uranyl nitrate solution.

4. In a process for forming a stable relatively non-corrosive uranyl and/or plutonyl nitrate solvent extraction feed solution from a neutron-irradiated uranium-molybdenum composition containing plutonium the steps which comprise contacting said composition with a gaseous oxyhydrochlorination mixture containing air and from about 10-60%, by volume, hydrogen chloride at a temperature in the range 400-450° C. to selectively volatilize at least a major portion of said molybdenum, contacting the resultant uranium-plutonium-containing oxyhydrochlorination residue with gaseous hydrogen chloride at a temperature of at least about 400° C. to selectively volatilize residual molybdenum, reacting the resultant uranium-plutonium product with air containing from 0.6 to no more than about 3% water, by volume, at a temperature in the range 100-400° C. to selectively volatilize chlorides from said product, and then dissolving the resultant relatively chloride-free product in an aqueous solution of nitric acid to form the said uranyl-plutonyl nitrate solvent extraction feed solution containing no more than about 200 p.p.m. chloride.

5. The method according to claim 4, wherein the said stable uranyl-plutonyl nitrate solution is contacted in a liquid-liquid solvent extraction system with an aqueous immiscible organic solvent for preferential extraction of uranium and plutonium values therefrom.

6. A process for separating uranium from a uranium alloy containing about 10% by weight of molybdenum which comprises contacting said alloy with a gaseous mixture consisting essentially of hydrogen chloride and air at a temperature in the range of about 400° C. to 600° C. to selectively volatilize at least a major portion of the molybdenum as molybdenum oxychloride and recovering the uranium oxide containing residue.

7. A process for separating uranium from a uranium-molybdenum composition which comprises contacting said composition with a gaseous mixture consisting essentially of hydrogen chloride and air at a temperature in the range of about 400° C. to 600° C. to selectively volatilize at least a major portion of the molybdenum as molybdenum oxychloride and recovering the resultant uranium oxide-containing residue.

8. A process for separating uranium from a uranium-molybdenum alloy containing a predominant amount of uranium by weight which comprises contacting said alloy with a gaseous mixture consisting essentially of hydrogen chloride and air at a temperature in the range of about 400° C. to 600° C. to selectively volatilize at least a major portion of the molybdenum as molybdenum oxychloride and recovering the resultant uranium oxide-containing residue.

References Cited in the file of this patent

UNITED STATES PATENTS

| 2,582,941 | Wilder | Jan. 15, 1952 |
| 2,865,704 | Jaffey et al. | Dec. 23, 1958 |
| 2,887,356 | Arnoff | May 19, 1959 |
| 2,910,344 | Davidson | Oct. 27, 1959 |

OTHER REFERENCES

ORNL 3019, pp. 1, 4-21, May 12, 1961.

Nuclear Science Abstracts, vol. 15, abstract 17007 which reports an article by Speeckaert (Brussels, Centre d'Etude de l'Energie Nucleaire), September 1, 1960, and this date relied on.

Katz et al.: "Chemistry of Uranium," Part I, 1st edition, pp. 322, 323, 580, 581 (1951).

Kileffer et al.: "Molybdenum Compounds," page 62, Interscience Publishers (1952).